US008452118B2

(12) United States Patent
Shin

(10) Patent No.: US 8,452,118 B2
(45) Date of Patent: May 28, 2013

(54) NOISE FILTER

(75) Inventor: Min Gyu Shin, Gyeonggi-do (KR)

(73) Assignee: Dongbu Hitek Co., Ltd., Seoul (KR)

( * ) Notice: Subject to any disclaimer, the term of this patent is extended or adjusted under 35 U.S.C. 154(b) by 748 days.

(21) Appl. No.: 12/643,615

(22) Filed: Dec. 21, 2009

(65) Prior Publication Data
US 2010/0166333 A1    Jul. 1, 2010

(30) Foreign Application Priority Data
Dec. 29, 2008    (KR) .......................... 10-2008-0135605

(51) Int. Cl.
*G06K 9/40*    (2006.01)
(52) U.S. Cl.
USPC ......................................... 382/264; 382/260
(58) Field of Classification Search
None
See application file for complete search history.

(56) References Cited

U.S. PATENT DOCUMENTS

| | | | | |
|---|---|---|---|---|
| 7,835,586 B2 * | 11/2010 | Porikli | ........................... | 382/260 |
| 8,081,836 B2 * | 12/2011 | Porikli | ........................... | 382/261 |
| 8,254,718 B2 * | 8/2012 | Bennett et al. | ................ | 382/275 |
| 2005/0168784 A1 * | 8/2005 | Mushano | ..................... | 358/3.06 |
| 2007/0098288 A1 * | 5/2007 | Raskar et al. | .................. | 382/254 |
| 2008/0159646 A1 * | 7/2008 | Katagiri et al. | ................ | 382/266 |
| 2008/0226190 A1 * | 9/2008 | Bae et al. | ....................... | 382/256 |
| 2009/0034865 A1 * | 2/2009 | Porikli | ........................... | 382/261 |
| 2009/0067740 A1 * | 3/2009 | Zhu et al. | ....................... | 382/260 |
| 2009/0285480 A1 * | 11/2009 | Bennett et al. | ................. | 382/167 |
| 2009/0290808 A1 * | 11/2009 | Ishiga | ............................ | 382/261 |

OTHER PUBLICATIONS

Frei et al., Fast Boundary Detection: A Generalization and a New Algorithm, IEEEE Transaction on Computer vol. C-26, No. 10, Oct. 1977, pp. 988-998.*

* cited by examiner

*Primary Examiner* — Randolph I Chu
(74) *Attorney, Agent, or Firm* — Saliwanchik, Lloyd & Eisenschenk

(57) ABSTRACT

A noise filter according to an embodiment includes: a first filter that functions as an edge detector to detect a high-frequency component area of an image; a second filter that performs a noise filtering function for the remaining areas of the image while conserving the high-frequency component area detected by the first filter; and a function processor that controls operations of the first filter and the second filter. According to an embodiment, since noise filtering for only a noise component area is performed by dividing the image into a high-frequency component area and a noise component area, it is possible to minimize deterioration of the high-frequency area and improve the resolution and quality of the image.

7 Claims, 3 Drawing Sheets

NOISE FILTER

CROSS-REFERENCE TO RELATED APPLICATION

This application claims the benefit under 35 U.S.C. §119 of Korean Patent Application No. 10-2008-0135605, filed Dec. 29, 2008, which is incorporated herein by reference in its entirety.

BACKGROUND

A noise filter serves to improve a signal to noise ratio (SNR) by reducing noise inputted to a system from an image sensor.

However, a generally used noise filter performs smoothing of an entire image in order to remove the noise, and as a result, image quality becomes deteriorated.

For example, noise filters such as a mean filter, a medium filter, and a Gaussian filter, smooth an image of an object by assuming pixel values of the entire image include the same general noise without differentiating detail areas such as an edge or a boundary of the image and texture areas expressing a texture and a grain of the object. That is, the filters do not differentiate between areas of the image having details or textures with those areas having general information.

Therefore, as a pixel of an image becomes higher, resolution decreases and overall quality of the image deteriorates.

BRIEF SUMMARY

An embodiment provides a noise filter that can improve resolution of a high-pixel and the quality of an image by dividing a high-frequency component area such as a detail area or a texture area and a noise component area, and smoothing only a noise component.

A noise filter according to an embodiment includes: a first filter that performs an edge detector function to detect a high-frequency component area of an image; a second filter that performs a noise filtering function for the remaining areas of the image while conserving the high-frequency component area detected by the first filter; and a function processor that controls operations of the first filter and the second filter.

DETAILED DESCRIPTION

Figure 1:
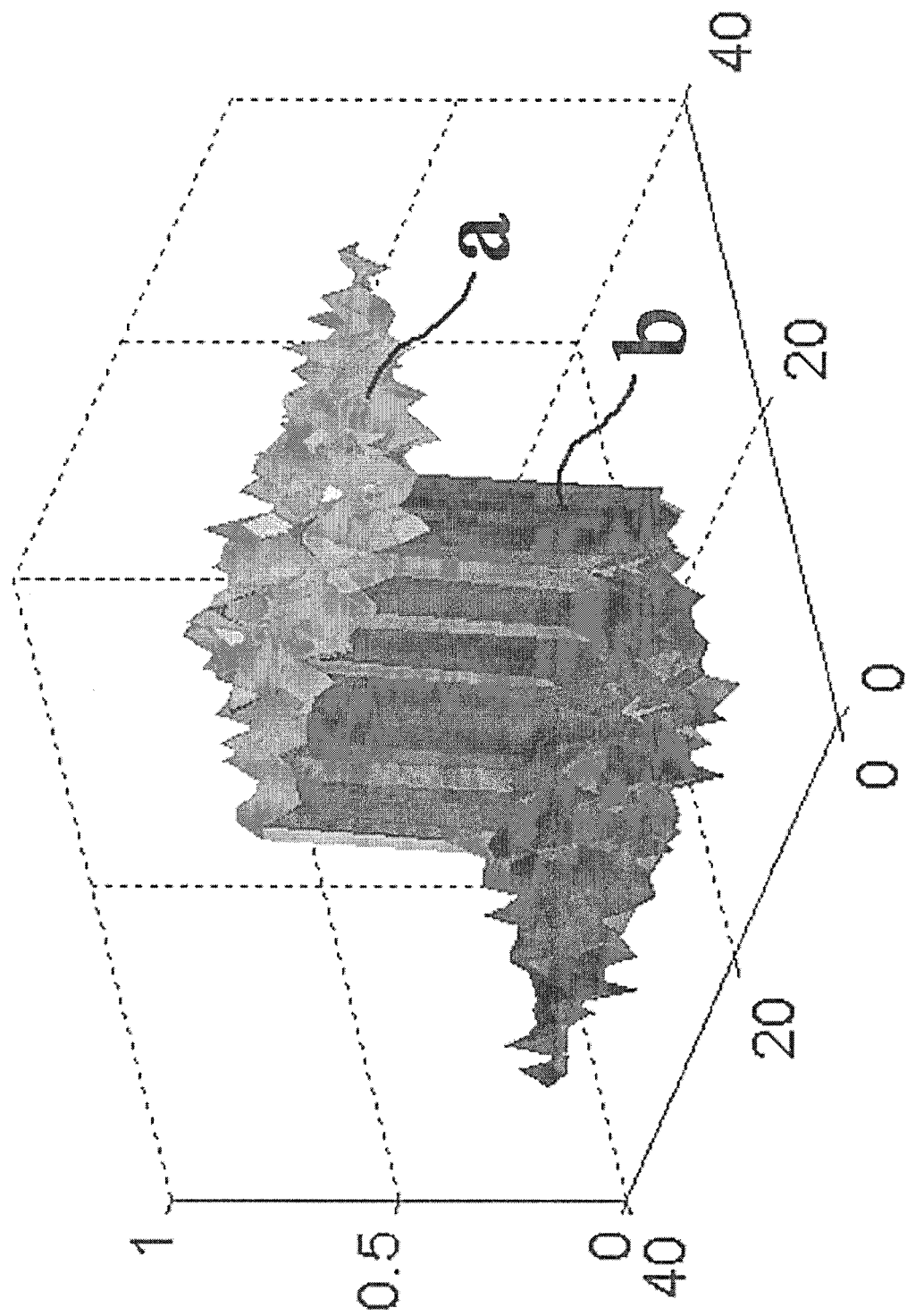
FIG. 1 is a graph showing a result of analyzing a pixel of an image not subjected to image processing.

A noise filter according to an embodiment will be described in detail with reference to the accompanying drawings.

Hereinafter, a detailed description of related known functions or components may make the purpose of the present invention obscure. Accordingly, components relating directly to the technical spirit of the present invention will be described.

The noise filter in accordance with an embodiment of the invention includes three general components, and each component will be described as follows.

<First Filter>

The first filter is a component that judges a high-frequency component area such as a detail area or a texture area. In case of an image photographing a face, the first filter can detect an edge component corresponding to the contour of the face.

The first filter may be a Frei-Chen (FC) edge detector, and can be expressed by the following matrix function.

$$FC_1 = \begin{bmatrix} 1.0000 & 1.4142 & 1.0000 \\ 0.0000 & 0.0000 & 0.0000 \\ -1.0000 & -1.4142 & -1.0000 \end{bmatrix}$$ Equation 1

$$FC_2 = \begin{bmatrix} 1.0000 & 0.0000 & -1.0000 \\ 1.4142 & 0.0000 & -1.4142 \\ 1.0000 & 0.0000 & -1.0000 \end{bmatrix}$$

$$FC_3 = \begin{bmatrix} 0.0000 & -1.0000 & 1.4142 \\ 1.0000 & 0.0000 & -1.0000 \\ -1.4142 & 1.0000 & 0.0000 \end{bmatrix}$$

$$FC_4 = \begin{bmatrix} 1.4142 & -1.0000 & 0.0000 \\ -1.0000 & 0.0000 & 1.0000 \\ 0.0000 & 1.0000 & -1.4142 \end{bmatrix}$$

In a specific embodiment, the first filter performs an edge detecting function in eight directions and uses a 3×3 kernel in each direction, such as shown in Equation 1.

<Second Filter>

The second filter is a component that performs a noise filtering function with respect to the remaining areas while conserving the high-frequency component area detected by the first filter.

The second filter may be a bilateral filter (BF), and can perform filtering by using two attributes, such as "spatial Gaussian" and "range Gaussian". This is different than a general Gaussian filter.

Therefore, the second filter can perform the noise filtering function by self-conserving a high-frequency component area comparatively that is smaller than the high-frequency component area detected by the first filter.

For example, if the first filter detects the contour of the face, the second filter can self-detect and conserve a high-frequency component area comparatively smaller than the contour of the face, such as a spot or winkles of the face surface. At the same time, noise filtering for the remaining areas is performed.

The second filter can be expressed by the following mathematical model and matrix function.

$$BF[I]_p = \frac{1}{W_p} \sum_{q \in S} G_{\sigma_s}(\|p-q\|) G_{\sigma_r}(I_p - I_q) I_q$$ Equation 2

$$\approx \frac{\sum_{q \in S} G_S G_{\sigma_r}(I_p - I_q) I_q}{\sum_{q \in S} G_S G_{\sigma_r}(I_p - I_q)}$$

$$= \frac{\sum_{q \in S} e^{\frac{-(I_q - I_p)^2}{2\sigma_r^2}} G_S I_q}{\sum_{q \in S} e^{\frac{-(I_q - I_p)^2}{2\sigma_r^2}} G_S}$$

In Equation 2, $G_{\sigma_s}(\|p-q\|) \approx G_s$ represents a matrix function $$(1/16) \times \begin{bmatrix} 6 & 8 & 9 & 10 & 9 & 8 & 6 \\ 8 & 10 & 12 & 13 & 12 & 10 & 8 \\ 9 & 12 & 14 & 15 & 14 & 12 & 9 \\ 10 & 13 & 15 & 16 & 15 & 13 & 10 \\ 9 & 12 & 14 & 15 & 14 & 12 & 9 \\ 8 & 10 & 12 & 13 & 12 & 10 & 8 \\ 6 & 8 & 9 & 10 & 9 & 8 & 6 \end{bmatrix}.$$

In addition, $I_p$ represents a main pixel to which the second filter is applied, $I_q$ represents a peripheral pixel to which the second filter is applied, $BF[I]_p$ represents the second filter being applied to the pixel $I_q$ of the image pixels, and $1/W_p$ represents a weight factor applied to each pixel of the image.

Further, $G_{\sigma_s}$ represents the "spatial Gaussian function", $G_{\sigma_r}$ represents the "range Gaussian function", and $G_{\sigma_r}(I_p-I_q)$ and $$\frac{-(I_q - I_p)^2}{2\sigma_r^2}$$

define a Gaussian series.

<Function Processor>

The function processor is a component that controls operations of the first filter and the second filter, and sequentially actuates the first filter and the second filter for each pixel. The function processor can judge that noise filtering for a predetermined area is not required in accordance with the position of each pixel and the intensity of the high-frequency component after the first filter is actuated.

When the function processor judges that the noise filtering is not required for the predetermined area, the function processor can selectively actuate the second filter.

Figure 2:
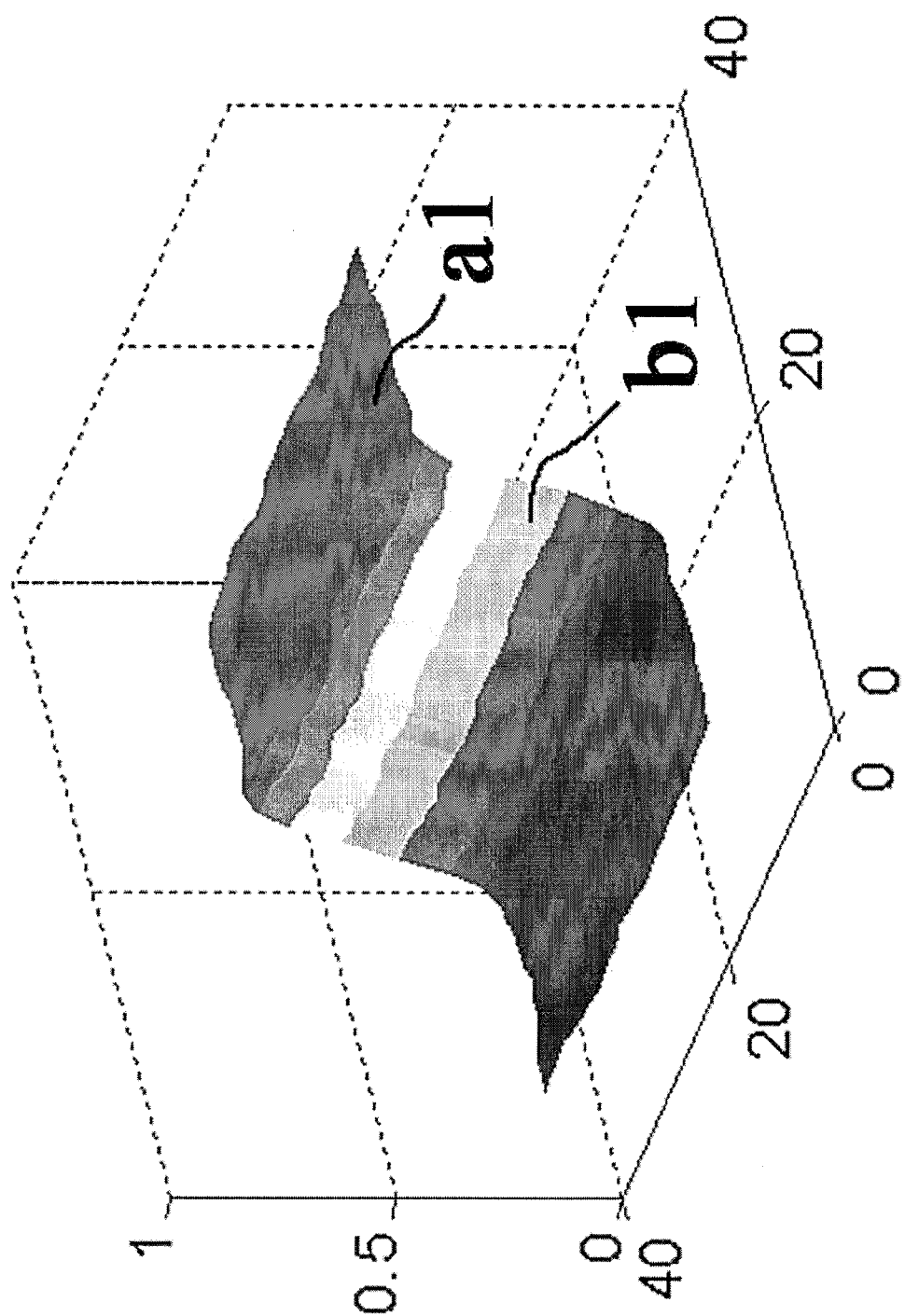
FIG. 2 is a graph showing a result of analyzing a pixel of an image processed by a known noise filter.
Figure 3:
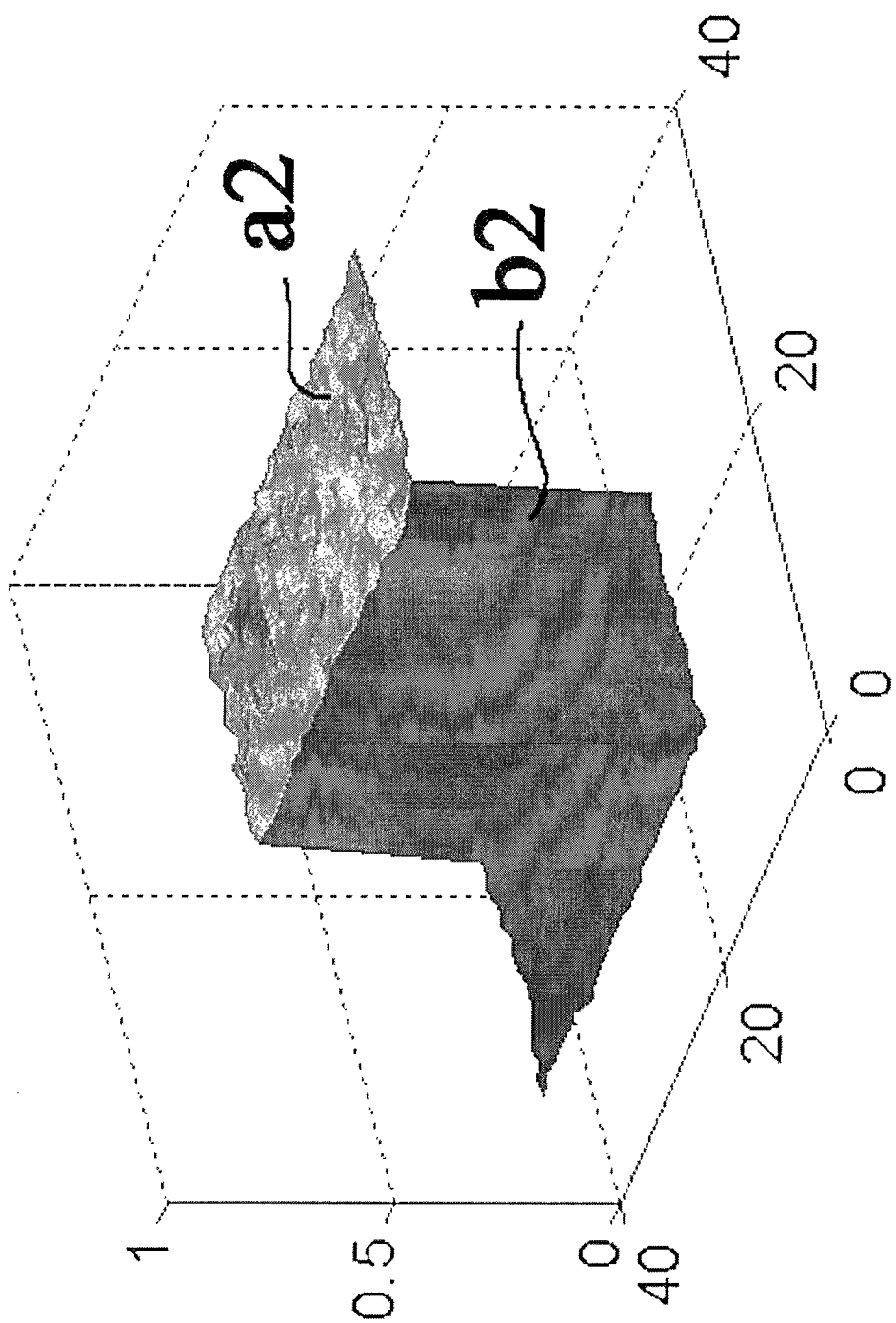
FIG. 3 is a graph showing a result of analyzing a pixel of an image processed by a noise filter of an embodiment.

FIG. 1 is a graph showing a result of analyzing a pixel of an image which is not subjected to image processing, FIG. 2 is a graph showing a result of analyzing a pixel of an image which is processed by a known noise filter, and FIG. 3 is a graph showing a result of analyzing a pixel of an image which is processed by a noise filter according to an embodiment.

In FIG. 1, an area "a" represents a low-frequency component area and an area "b" represents the high-frequency component area. Many noise components, in the form of white Gaussian noise, exist in the low-frequency component area.

As shown in FIG. 2, many noise components of a low frequency component area "a1" is removed by the known noise filter, but a high-frequency component area "b1", which is the edge area, has a vertical gradient, thereby deteriorating the resolution.

In contrast, referring to FIG. 3, a high-frequency component area "b2" maintains a vertical state while noise components of an area "a2" are removed by the noise filter in accordance with an embodiment. Here, the edge area is excluded from the noise filtering and has its unique resolution.

According to an embodiment, since noise filtering for only a noise component area is performed by dividing the image into a high-frequency component area and a noise component area, it is possible to minimize deterioration of the high-frequency area and improve the resolution and quality of the image.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A noise filter, comprising:

a first filter performing as an edge detector to detect a high-frequency component area of an image;

a second filter performing a noise filtering function for remaining areas of the image while conserving the high-frequency component area detected by the first filter; and a function processor that controls operations of the first filter and the second filter, wherein the second filter is defined by an equation of $$BF[I]_p = \frac{1}{W_p} \sum_{q \in S} G_{\sigma_s}(\|p-q\|) G_{\sigma_r}(I_p - I_q) I_q$$

$$\approx \frac{\sum_{q \in S} G_S G_{\sigma_r}(I_p - I_q) I_q}{\sum_{q \in S} G_S G_{\sigma_r}(I_p - I_q)}$$

$$= \frac{\sum_{q \in S} e^{\frac{-(I_q - I_p)^2}{2\sigma_r^2}} G_S I_q}{\sum_{q \in S} e^{\frac{-(I_q - I_p)^2}{2\sigma_r^2}} G_S},$$

where $G_{\sigma_s}(\|p-q\|) \approx G_s$ represents a matrix function of $$(1/16) \times \begin{bmatrix} 6 & 8 & 9 & 10 & 9 & 8 & 6 \\ 8 & 10 & 12 & 13 & 12 & 10 & 8 \\ 9 & 12 & 14 & 15 & 14 & 12 & 9 \\ 10 & 13 & 15 & 16 & 15 & 13 & 10 \\ 9 & 12 & 14 & 15 & 14 & 12 & 9 \\ 8 & 10 & 12 & 13 & 12 & 10 & 8 \\ 6 & 8 & 9 & 10 & 9 & 8 & 6 \end{bmatrix}.$$

2. The noise filter according to claim 1, wherein the first filter is expressed by a matrix function of $$FC_1 = \begin{bmatrix} 1.0000 & 1.4142 & 1.0000 \\ 0.0000 & 0.0000 & 0.0000 \\ -1.0000 & -1.4142 & -1.0000 \end{bmatrix}$$

$$FC_2 = \begin{bmatrix} 1.0000 & 0.0000 & -1.0000 \\ 1.4142 & 0.0000 & -1.4142 \\ 1.0000 & 0.0000 & -1.0000 \end{bmatrix}$$

$$FC_3 = \begin{bmatrix} 0.0000 & -1.0000 & 1.4142 \\ 1.0000 & 0.0000 & -1.0000 \\ -1.4142 & 1.0000 & 0.0000 \end{bmatrix}$$

$$FC_4 = \begin{bmatrix} 1.4142 & -1.0000 & 0.0000 \\ -1.0000 & 0.0000 & 1.0000 \\ 0.0000 & 1.0000 & -1.4142 \end{bmatrix}.$$

3. The noise filter according to claim 1, wherein the first filter performs as the edge detector in eight directions from a pixel of the image and uses a 3×3 kernel in each direction.

4. The noise filter according to claim 1, wherein the second filter is a bilateral filter (BF) and performs the noise filtering function while conserving a second high-frequency component area comparatively smaller than the high-frequency component area detected by the first filter by performing filtering by using two attributes.

5. The noise filter according to claim 4, wherein the two attributes are "spatial Gaussian" and "range Gaussian".

6. The noise filter according to claim 1, wherein the function processor sequentially actuates the first filter and then the second filter for each pixel.

7. The noise filter according to claim 1, wherein the function processor judges whether noise filtering is not required with a predetermined area in accordance with the position of each pixel and the intensity of a high-frequency component after the first filter is actuated, and selectively actuates the second filter depending on the judgment result.

* * * * *